4 Claims

3,609,794
WINDSHIELD WIPER ARRANGEMENT
Hans-Georg Schallehn, Kassel, Germany, assignor to Rheinstahl Henschel Aktiengesellschaft, Kassel, Germany
Filed Aug. 26, 1969, Ser. No. 853,078
Claims priority, application Germany, Aug. 27, 1968,
P 17 80 290.3
Int. Cl. A47l 1/03
U.S. Cl. 15—250.24

ABSTRACT OF THE DISCLOSURE

A windshield wiper, especially for two or more panes at an angle to each other, in which a blade for each pane is pressed toward the pane and moves in parallelism with itself back and forth across the pane. Endless drive elements at a pair of opposed edges of the panes engage the ends of the blades and are driven in oscillation to actuate the blades.

---

The present invention relates to a windshield wiper arrangement for windshields and similar window panes, especially of land, air and water vehicles for window means protruding from armored cabins.

Windshield wipers for cleaning and maintaining in clear condition the front window panes of, for instance, vehicles are generally known and substantially comprise a drive shaft with holding means linked thereto and subjected to a spring pressure, while the free ends of said wipers are equipped with an elastic arm holding a wiper strip. The drive shaft is in most instances arranged below the windshield to be cleaned and is operated by an electric motor while being able to carry out intermittent movements in clockwise and counter-clockwise direction so that the wiper blade moves to opposite sides along the windshield.

With a design of this type, outside the radius of action of the wiper blades there exists a dead angle in the range of which the wiper blade does not move over the windshield. In addition thereto, the heretofore known wipers of the type involved are limited in their effect as to the width of the window and, therefore, in order to keep the window clear within the horzontal range thereof, it is necessary with a long window or with a window interrupted by a central strut or with windows composed of sections arranged at an angle with regard to each other, to provide a plurality of such wipers adjacent to each other. Such a design comprises a relatively large amount of material and consequently is expensive. Moreover, these known windshield wipers create only a limited field of view and thus do not materially contribute to the elimination of the above mentioned limited field of view.

It is, therefore, an object of the present invention to provide a window wiping arrangement which will overcome the above mentioned drawbacks.

It is another object of this invention to provide a window wiping arrangement, especially a windshield wiper design which will be simple in construction and which will make it possible for the wiper blade to move over the entire area of the window or windshield.

These and other objects and advantages of the invention will appear more clearly from the following specification in connection with the accompanying drawings, in which.

The wiper arrangement according to the present invention is characterized primarily in that at the upper and lower rim portion of the opening which receives the window pane there are provided pulling means which are interconnected by means of at least one wiper blade which is centrally arranged and is passed over a plurality of rollers while being reversibly but synchronously movable by means of a driving device.

However, it may occur that a central arrangement of the wiper blade is not possible, for instance, when a plurality of windows or windshields are provided which are subdivided by vertical struts. In such an instance it is suggested, according to the present invention, to provide a number of wiper blades between the upper and lower pulling means, the number of wiper blades corresponding to the number of the windows or windshields.

In order to assure a sufficient adhesion between the wiper blade and the window pane or the like, elastic pressure strips for the pulling means are provided in the upper and lower longitudinal strut of each window frame within the area of the window section to be kept clear, said elastic pressure strips facing the window area to be kept clear.

A further feature of the invention consists in that each pulling means is endless and is passed about a driving roller as well as over one or more deviating rollers. Furthermore, each pulling means is provided with means for connecting the wiper blade or blades thereto. More specifically, each pulling means preferably comprises a belt having its inner side provided with teeth while its outer side which faces away from said teeth is provided with recesses extending in the longitudinal direction of the belt.

According to a further fetaure of the invention, the driving roller has teeth in the upper and lower range which teeth correspond to the teeth of the pulling means. Each deviating roller is freely rotatable and in its upper and lower section has one constriction each in the form of a closed groove for guiding the pulling means. According to a particularly advantageous arrangement of the present invention, the driving means comprises an electric motor and a crank drive which is connected to the driving roller. Expediently, the elements of the crank drive are variable as to their length.

Figure 1:
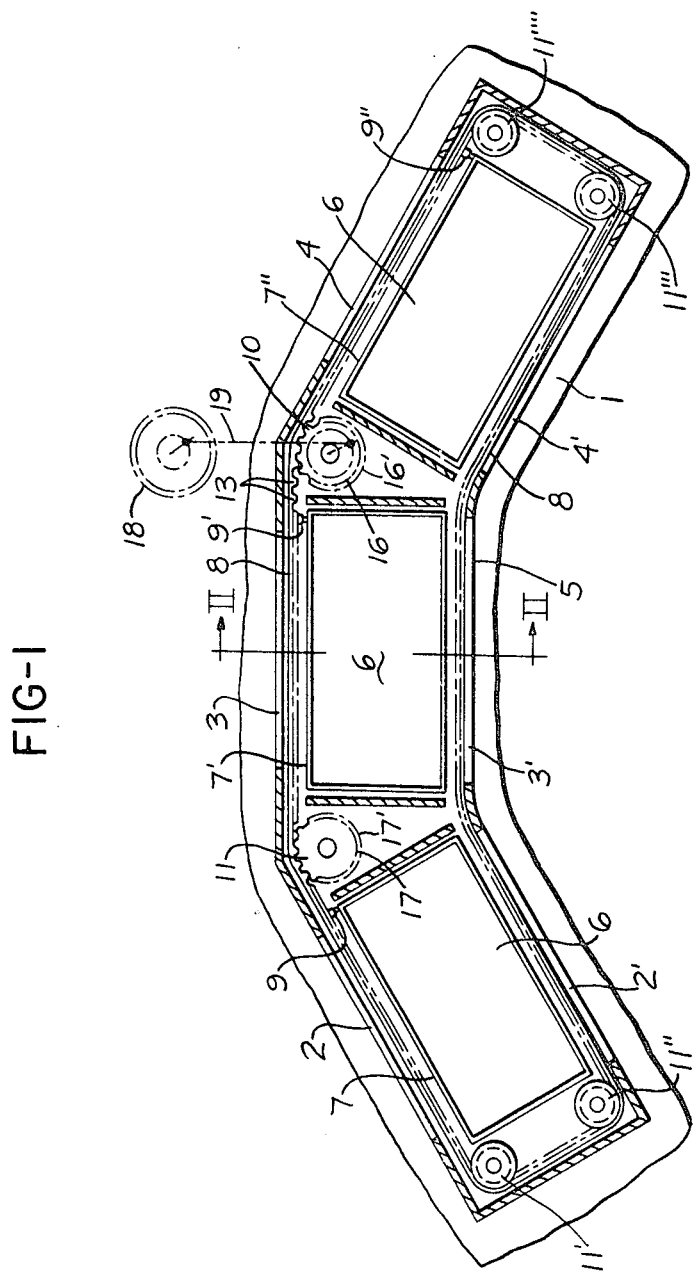
FIG. 1 shows the wiper arrangement according to the present invention with the housing upper portion removed.
Figure 2:
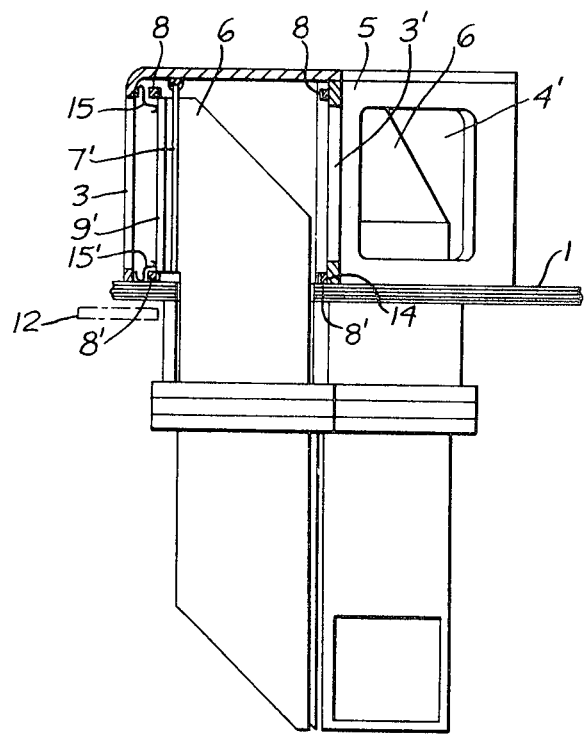
FIG. 2 represents a section taken along the line II—II of FIG. 1.
Figure 3:
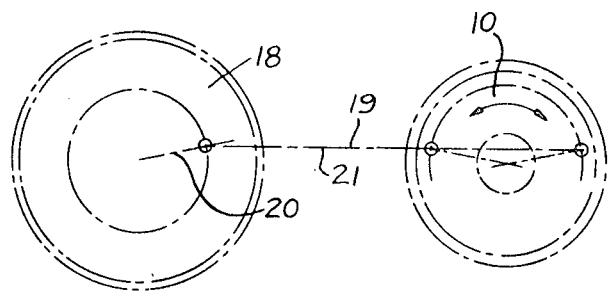
FIG. 3 illustrates a detail of the invention on a somewhat larger scale than that of FIGS. 1 and 2.
Figure 4:
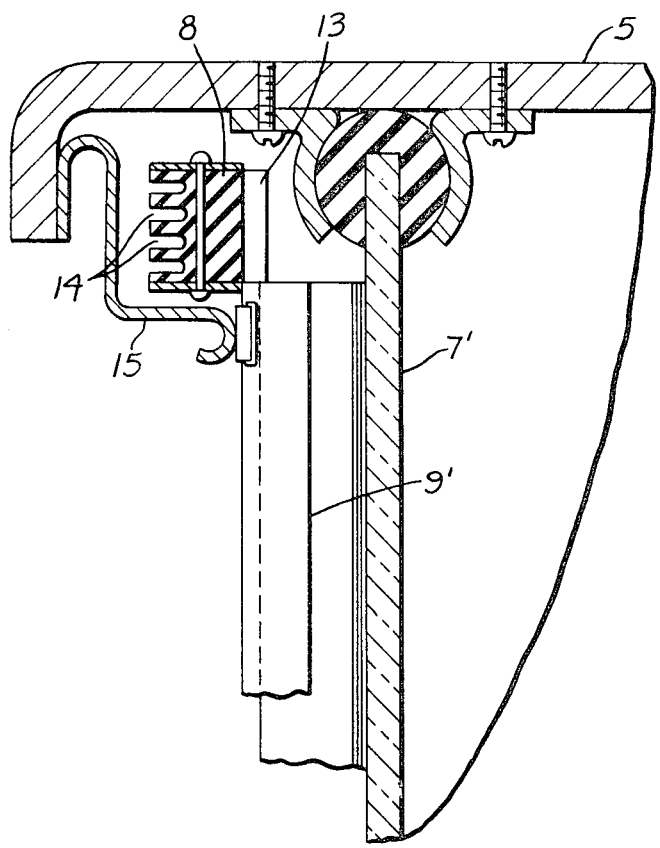
FIG. 4 illustrates on a larger scale the wiper blade arrangement.
Figure 5:
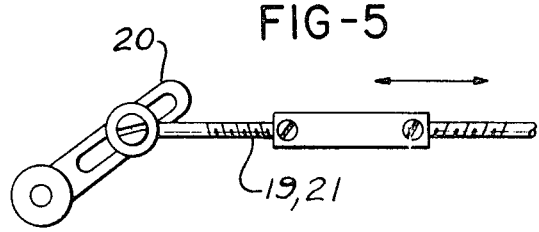
FIG. 5 shows how the elements of the crank drive can be varied in length.

Referring now to the drawings in detail, FIG. 1 shows a part of a vehicle 1 which has a housing 5 with diametrically oppositely located openings 2, 2'; 3, 3'; and 4, 4'. Within the housing 5 there are provided angle mirrors 6 which may be, for example, the upper ends of periscopes, one for each opening. Behind each housing opening there are respectively provided windshields or window panes 7, 7', 7" which are on both sides confined by vertical struts. The window panes 7, 7' and 7" are adapted to be kept clear and clean by means of a wiper system which is located outside said window panes.

The wiper arrangement according to the present invention substantially comprises an upper and a lower endless pulling means 8, 8', a number of wiper blades 9, 9', 9" corresponding in number to the number of the window panes, and a plurality of deviating rollers 10, 11 as well as a driving device 12. Each pulling means 8, 8' preferably comprises a belt which on its inside is provided with teeth 13 whereas its outer side is provided with recesses 14 extending in the longitudinal direction of the pulling means. Between the upper and lower pulling means 8, 8' and connected thereto are the wiper blades 9, 9', 9". The upper and lower longitudinal strut of each window frame is within the range of the window pane provided with a recess facing said window pane. An elastic pressure strip 15, 15' is arranged in said recess and is so designed that the wiper blade will continuously press against the window pane. The driving roller 10 is by means of a pivot journalled at the top and bottom in the housing 5 and within the upper and lower area has teeth 16, 16' which correspond to the teeth 13 of the pulling means 8, 8'. The deviating rollers 11, 11', 11", 11''' and 11'''' are freely rotatably arranged and are for guiding the pulling means 8, 8' provided at their upper and lower sections with a constriction 17, 17' in the form of a closed groove.

The driving roller 10 is driven by an electric motor 18 through the intervention of a crank drive 19. In order to be able to adapt the working range of the wiper blades to the respective requirements, the elements, i.e. the crank 20 as well as the coupling member 21 of the crank drive 19, are variable as to length.

The advantages realized by the arrangement according to the present invention may be summarized by pointing out that the entire window pane is wiped by the wiper blade and that the working range of the wiper blade can be adapted to the respective requirements. Each blade moves back and forth over the respective pane in parallelism with itself.

In addition thereto, the wiper arrangement according to the present invention has further advantages inasmuch as all elements required for the movement of the wiper blades are protected in the window pane frame and are arranged below the same whereby the arrangement can be made rather flat with regard to space. This is highly advantageous with angle mirrors located in armored vehicles. Simultaneously the requirement as to a direct shooting-through possibility is met.

It is, of course, to be understood that the present invention is, by no means, limited to the particular showing in the drawings but also comprises any modifications within the scope of the appended claims, particularly with regard to the drive and the connecting elements.

What is claimed is:

1. A wiper arrangement for windshield means or like pane means having a pair of opposed edges comprising: drive elements extending along each of said opposed edges, wiper blade means connected to and extending between said drive elements, said wiper blade means engaging said pane means so as to wipe the pane means when moved thereover by said drive elements, drive means engaging said drive elements for reversibly actuating said elements in unison to move said blade means back and forth across said pane means while holding said blade means in parallelism with themselves, said pane means comprising at least two panes in end to end relation, said panes being mounted in a frame comprising a frame member between the ends of said panes, said blade means comprising a blade for each pane, each blade being connected to said drive elements and said blades moving in unison over the respective panes, and resilient means parallel to said panes and operatively engaging each said blade near the opposite ends thereof and urging the blades toward the respective panes.

2. A wiper arrangement for windshield means or like pane means having a pair of opposed edges comprising: drive elements extending along each of said opposed edges, wiper blade means connected to and extending between said drive elements, said wiper blade means engaging said pane means so as to wipe the pane means when moved thereover by said drive elements, drive means engaging said drive elements for reversibly actuating said elements in unison to move said blade means back and forth across said pane means while holding said blade means in parallelism with themselves, said pane means comprising at least two panes in end to end relation, said panes being mounted in a frame comprising a frame member between the ends of said panes, said blade means comprising a blade for each pane, each blade being connected to said drive elements and said blades moving in unison over the respective panes, said panes being at an angle to each other and deviating rollers being provided engaging said drive elements at least at the ends of said panes so as to guide said drive elements in parallelism with said panes along the lengths of said drive elements which are adjacent said panes, each said drive element being an endless flexible belt-like member having teeth on the side facing the said panes and roller means being provided supportingly engaging said drive elements and guiding said drive elements to move in closed paths in the planes of the said opposed edges of the panes, each drive element including means for the conneciton thereto of the adjacent ends of said blades, said drive means including a toothed roller engaging each drive element on the side thereof having the teeth, each drive element including recesses extending longitudinally thereof on the side opposite the side having the said teeth, each said roller means being annularly grooved and receiving the respective drive element in the said groove.

3. A wiper arrangement for windshield means or like pane means having a pair of opposed edges comprising: drive elements extending along each of said opposed edges, wiper blade means connected to and extending between said drive elements, said wiper blade means engaging said pane means so as to wipe the pane means when moved thereover by said drive elements, and drive means engaging said drive elements for reversibly actuating said elements in unison to move said blade means back and forth across said pane means while holding said blade means in parallelism with themselves, said drive means including an electric motor and a crank mechanism connecting said motor with said drive elements whereby unidirectional rotation of said motor will cause oscillating motion of said drive elements.

4. A wiper arrangement according to claim 3, in which said crank mechanism includes adjustable elements to provide for variation of the oscillatory motion of said drive elements.

References Cited

UNITED STATES PATENTS

| | | | |
|---|---|---|---|
| 1,803,722 | 5/1931 | Moon | 15—250.24 |
| 2,112,197 | 3/1938 | Horton | 15—250.24 |
| 3,354,494 | 11/1967 | Rischman | 15—250.24 |

ROBERT W. JENKINS, Primary Examiner